(No Model.)

J. S. DICKEY.
ANIMAL POKE.

No. 552,898. Patented Jan. 14, 1896.

Witnesses

Inventor
John S. Dickey,
By his Attorneys,

UNITED STATES PATENT OFFICE.

JOHN S. DICKEY, OF CLAUDE, TEXAS.

ANIMAL-POKE.

SPECIFICATION forming part of Letters Patent No. 552,898, dated January 14, 1896.

Application filed August 31, 1894. Serial No. 521,848. (No model.)

*To all whom it may concern:*

Be it known that I, JOHN S. DICKEY, a citizen of the United States, residing at Claude, in the county of Armstrong and State of Texas, have invented a new and useful Animal-Poke, of which the following is a specification.

My invention relates to an improvement in those animal-pokes which are adapted to be placed over the animal's neck and provided with spurs, whereby the animal is pricked when he attempts to pass a fence or other barrier; and the object of the invention is to produce an appliance of this class and one which can be worn with greater ease and less liability of pricking the animal while simply grazing. This object I attain by certain improvements on the construction and arrangement of parts, all of which will be more fully described in detail and finally embodied in the claims.

Figure 1:
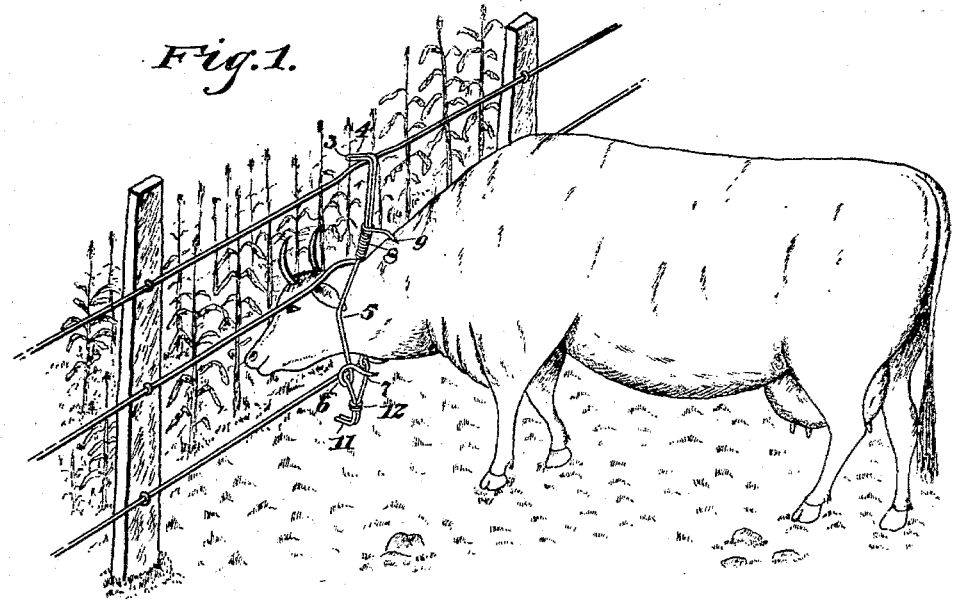
Figure 2:
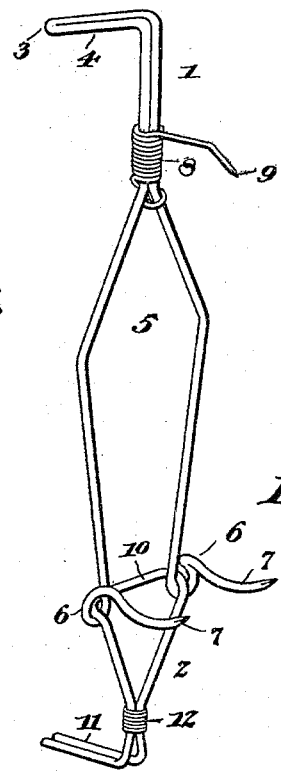
Figure 3:
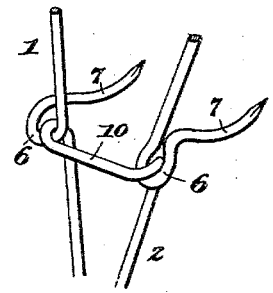
Figure 4:
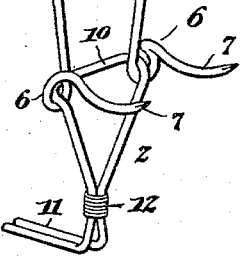

In the accompanying drawings, Figure 1 represents a view of a cow having my improvements applied; Fig. 2, an enlarged perspective of the arrangement detached; Fig. 3, a detail view showing the means for joining the two sections; Fig. 4, a similar view of the upper spur.

The arrangement is formed approximately of two sections 1 and 2, both of which are formed of stout steel wire bent into the required shape. The section or yoke 1 is formed of an integral piece of wire bent first at its middle or the point 3, so that its sections will extend parallel with each other, and from the point 3 the wires are bent rearwardly to form the L-shaped hook or arm 4, and thence downwardly at right angles to the first bend. After extending downwardly for a distance equal to about twice the length of the arm 4 the sections of wire are spread apart to form the yoke 5.

The lower end of the yoke or the ends of the wire composing section 1 are curved toward each other and terminate a slight distance apart, where they are each bent outwardly and thence upwardly at 6, and finally rearwardly and horizontally, terminating in the spurs 7 and forming at the bends 6 substantially two eyes, one for each end of the wire. 8 indicates a third spur, which is arranged at the upper end of the yoke 5 and formed of a piece of steel wire bent to form the downwardly-extending point 9, while the remaining part of the wire is wrapped around the two sections of the wire 1 to form a sleeve, whereby the spur is rigidly secured in place and the sections or sides are held against separation. The section or loop 2 is substantially triangular, and is also formed of an integral piece of wire shaped to form the horizontal upper bar 10, which extends across from the lower ends of wires 1 and is bent rearwardly, so as to extend through the eyes 6, and from here they extend downwardly and toward each other and meet at a point a little more than midway the length of the section. After the wires of section 2 meet they are bent forwardly at right angles to the main portion and to form the L-shaped hook or arm 11. Secured to the wires of section 2 at the point where they meet is the fastening device 12, which consists of a strip of wire bent around the two sections, so as to hold them removably in place.

The sections 1 and 2 are joined to each other by releasing the fastening device 12, thus making it possible to spread the arms of section 2 and pass them through the eyes 6, after which the arms are fastened again by the device 12. To secure the instrument on the animal's neck, as shown in Fig. 1, the section 2 is removed and the lower end of the wires composing the section 1 passed over the animal's neck. The section 2 is now placed in position and its wires secured, as explained.

It is essential, of course, that the spurs 7 and 8 be located to the rear of the poke, when it is in place, so as to be in position to engage the animal's shoulders.

An animal supplied with this device will not be able to pass any fence or other obstruction, since, if he attempts to pass over it, the arm 11 will engage the fence and draw the lower end of section 1 rearwardly, causing spurs 7 to pierce the animal's shoulders and prompting him to retract his movements. On the other hand, if he attempts to pass under a wire arm 4 will engage therewith and cause spur 8 to pierce the shoulders or neck of the animal, with the same results that attended the operation of spurs 7. Owing to the arrangement of section 2 on its companion, said section will be free to swing rearwardly and thus allow the animal having the device applied free movements when grazing or lying down; but by no means can he avoid its positive engagement with the fence in event of his attempting to pass it.

By reference to the drawings it will be seen that the section 2 is so mounted on the companion section that it will be free to swing rearwardly, but be incapable of swinging forwardly, since the bar 10 will, upon such a movement, engage the wires of section 1 at the point directly adjacent to the bend which forms eye 6, thereby preventing the bar from moving farther to the rear, and as this operation is essential to the forward movement of the main part of the section such forward movement is suppressed. It will be understood that any suitable fastening device may be used in place of the wire 12, all that is essential being that the device be of a removable character, so as to permit its removal and a consequent spreading of the wires of section 2.

Having described my invention, what I claim is—

1. An animal poke comprising a yoke to sit astraddle of the animal's neck, and having the lower ends of its side members normally separated and bent to form eyes and rearwardly-extending spurs, and a substantially triangular loop supported in the eyes formed at the lower ends of the yoke members and connecting the latter, the upper cross bar being deflected forwardly so as to lie in a plane different from the plane of the loop and adapted to engage with the lower ends of the yoke members to limit the movement of the loop in one direction, and the lower portions of the loop members being brought together and secured and bent forwardly to provide a hook, substantially as described for the purpose specified.

2. As an improved article of manufacture, an animal poke consisting of a yoke formed of a single length of wire folded upon itself and bent to provide an upper forwardly-extending hook and side members which are normally separated at their lower ends and terminating in eyes and rearwardly-extending spurs, a binding wire wrapped about the said side members immediately above the yoke proper and terminating in a rearwardly-extending spur, and a substantially triangular loop supported in the eyes at the lower ends of the yoke members and connecting the latter, the horizontal bar of the loop lying in a plane forward of a plane passing through the loop and constructed to engage with the yoke members and limit the movement of the loop in one direction, the side members of the loop coming together at their lower ends, which are secured together and bent forwardly to provide a hook, substantially as set forth for the purpose described.

In testimony that I claim the foregoing as my own I have hereto affixed my signature in the presence of two witnesses.

JOHN S. DICKEY.

Witnesses:
B. G. SWEET,
H. F. JONES.